United States Patent [19]

Kurita et al.

[11] Patent Number: 4,656,221

[45] Date of Patent: Apr. 7, 1987

[54] COMPOSITION FOR CONCEALING GRAZE MARKS ON TRANSPARENT GLASS BOTTLE

[75] Inventors: Akitsugu Kurita; Kazou Maruyama, both of Ohta; Akira Okusa; Haruo Hayashi, both of Matsudo, all of Japan

[73] Assignees: Toshiba Silicone Co., Ltd.; Asahi Breweries Ltd., both of Tokyo, Japan

[21] Appl. No.: 745,345

[22] Filed: Jun. 14, 1985

[30] Foreign Application Priority Data

Jun. 20, 1984 [JP] Japan ................................ 59-126689

[51] Int. Cl.$^4$ .......................... C08L 83/10; C08K 5/24
[52] U.S. Cl. ....................................... 524/731; 428/429
[58] Field of Search ..................... 524/731; 106/287; 428/429

[56] References Cited

U.S. PATENT DOCUMENTS

| | | | |
|---|---|---|---|
| 3,574,673 | 4/1971 | Schweiger et al. | 428/450 |
| 4,228,054 | 10/1980 | Ona | 524/722 |
| 4,273,834 | 6/1981 | Yokokura et al. | 428/429 |
| 4,370,385 | 1/1983 | Yoshida et al. | 427/387 |
| 4,467,068 | 8/1984 | Maruyama et al. | 524/731 |
| 4,551,516 | 11/1985 | Kitamura | 524/731 |

Primary Examiner—Theodore Morris
Attorney, Agent, or Firm—Flynn, Thiel, Boutell & Tanis

[57] ABSTRACT

Disclosed is a composition for concealing graze marks on a transparent glass bottle which comprises:

(A) 100 parts by weight of polydiorganosiloxane having a viscosity of 10 to 100,000 cSt at 25° C. in which 15 to 60 mole percent of an organic group bonded to a silicon atom is an organic group selected from the group consisting of a phenyl group, an aralkyl group and an alkyl group having carbon atoms of 6 or more, (B) 1 to 100 parts by weight of film-forming polyorganosiloxane comprising:
 (1) two or more straight-chain diorganosiloxane portion constituted by 10 or more diorganosiloxane units, and
 (2) one or two or more cross-linking portion or portions formed by a reaction of an amino group bonded to a silicon atom through at least one carbon atom and zero or at least one nitrogen atom bonded indirectly to a silicon atom, with an epoxy group bonded to an other silicon atom through at least one carbon atom and zero or at least one oxygen atom bonded indirectly to a silicon atom, wherein the proportional ratio of Part (2) in Component (B) is 0.1 to 30 % by weight, (C) 1 to 30 % by weight of a cationic surfactant or a surfactant mixture in which a part of the cationic surfactant is replaced with a nonionic surfactant based on the total amount of Components (A) and (B), (D) 60–1,000 % by weight of water based on the total amount of Components (A) and (B), whereby forming a film having refractive index of 1.42 to 1.55 on the surfaces of glass bottles.

11 Claims, No Drawings

COMPOSITION FOR CONCEALING GRAZE MARKS ON TRANSPARENT GLASS BOTTLE

The present application claims priority of Japanese patent application Ser. No. 84/126689 filed June 20, 1984.

BACKGROUND OF THE INVENTION

The present invention relates to a coating agent which is suitable for concealing grazes or scratches on glass surfaces such as repeatedly reusable colorless or pale transparent glass bottles. More particularly, the present invention relates to an emulsion composition whose principal ingredients are polydiorganosiloxane capable of forming an adhesive film on a glass surface at room temperature and polydiorganosiloxane which is liquid at room temperature, and a concealing agent to be applied to colorless or pale transparent glass bottles whose surfaces are grazed or scratched to form a film recovering a transparency.

Glass bottles used as containers for soft drinks, milk, etc. are usually collected after use and repeatedly reused. On the surface of such glass bottles, grazes are caused by the bottles contacting one another or contacting metal such as in machines utilized in the packing process or distribution. As the appearance of the bottles becomes less attractive by repeated reuse, the value of the packaged goods also apparently becomes lower.

To prevent the degradation of the appearance of the glass bottles several proposals have been made to form a graze-proof film or to form a concealing film for grazes. However, a satisfactory material has not been found because a variety of properties are necessary to form such graze-proof agents or concealing agents. Some properties which must be present simultaneously include:

(1) (a) For a graze-proof film: Excellent film strength under grazing conditions.
   (b) For a concealing film: Excellent concealing properties of the graze.
(2) Good water resistance and no oil film formed on water when the coated bottle is dipped into water.
(3) No change in the appearance of the bottle; no stickiness and no unusual lubricity due to the presence of the coating film.
(4) Easy handling.
(5) (a) Perfect removability by a bottle washing process utilizing an alkaline solution, or
   (b) resistance to a bottle washing process and no hindrance to the labeling or other process.
(6) Safe for contact with the human body or foods.
(7) No odor.

Japanese Provisional Patent Publication No. 56040/1980 (which corresponds to U.S. Pat. No. 4,273,834) proposed such a concealing agent formed from a polyorganosiloxane resin containing methyl, phenyl and alkoxy groups bonded to silicon atoms. This concealing agent, however, is dissolved at a higher molecular weight stage only by hydrocarbon solvents such as toluene, xylene or gasoline. Therefore, it is not suitable for application to food containers from a standpoint of hygiene. When the concealing agent is made from a low molecular weight the polyorganosiloxane can be dissolved in ethanol so the foregoing problem is avoided, but there are disadvantages that expensive ethanol is required as the solvent, and that such as low molecular weight polyorganosiloxane resin results in a film having insufficient film strength and adhesiveness to glass so that the film formed falls off irregularly during the bottle washing process and thus causes a poorer appearance than an uncoated bottle.

An adhesive coating material in which the principal ingredient is polyorganosiloxane having siloxane units containing an amino group-containing organic bonded to the silicon atom to improve adhesiveness is described by Japanese Patent Publication No. 3627/1971, (which corresponds to U.S. Pat. No. 3,574,673) as a metal surface leveling agent. This coating material, however, has several disadvantages for purposes of the present invention:

(1) it is highly flammable and toxic due to the use of a solvent;
(2) the film formed falls off irregularly during the bottle washing process; and,
(3) the film becomes yellowish upon storage because of the large number of amino group-containing organic groups which are necessary for improving adhesiveness.

Several latexes and emulsions of polyorganosiloxanes having functionality such as an amino group-containing group, a mercapto group-containing group and/or a trialkoxysilyl group to give an adhesiveness and/or form a cross-linked structure is proposed as a treating agent for fibers and the like in Japanese Provisional Patent Publication No. 131661/1979 (which corresponds to U.S. Pat. No. 4,228,054). However, when such a latex or emulsion is used for coating glass bottles, because its principal ingredient is a cross-linkable polyorganosiloxane, the film formed from the latex or emulsion having only these components by the effective ingredients falls off irregularly or the surface of the film becomes roughened by the bottle washing process. Additionally, when a tin compound is used as a catalyst accelerating the cross-linking, there is the disadvantage of toxicity.

The present inventors have previously made investigations concerning a concealing agent for grazes or scratches on glass bottles, and as a result, they have found that a concealing agent comprising a composition obtained by mixing an emulsion primarily comprising a polyorganosiloxane which is capable of forming a film having adhesiveness on glass surfaces at a room temperature and an emulsion primarily comprising a polydiorganosiloxane which is a liquid at room temperature could be removed by a washing process completely and it could sufficiently satisfy other requirements necessary for a concealing agent and thus overcome the above problems (Japanese Provisional Patent Publication No. 167449/1983 which corresponds to U.S. Pat. No. 4,467,068). While such an emulsion composition satisfies properties required for the aforesaid concealing agent for grazes or scratches, it remains a problem that a graze concealing effect is insufficient when a concealing agent for grazes or scratches which comprises a polyorganosiloxane of which all of or most parts of organic group bonded to silicon atoms are methyl groups has been applied to colorless or pale transparent glass bottles. Thus, it is preferred to apply them to conceal grazes or scratches on bottles of dark colors such as glass for beer containers or opaque glass, but it is restricted in appearance to use on colorless or pale transparent glass bottles such as glass for soft drinks or milk.

SUMMARY OF THE INVENTION

The present inventors have found that, by introducing, in at least the organic groups bonded to the silicon atoms of the polydiorganosiloxane that is liquid at room temperature an alkyl group of 6 or more carbon atoms, and preferably by further introducing the same organic groups as mentioned above in the film-forming polyorganosiloxane in the above emulsion compositions, and controlling a refractive index of the obtained polysiloxane film within the range of 1.42 to 1.55, preferably 1.48 to 1.54 which is similar to those of glasses for bottles ordinary used, the obtained composition has the same graze concealing effect as mentioned above even when it has been applied to colorless or pale transparent glass bottles, and thus the present invention is accomplished.

Namely, the present invention is to provide a concealing agent for grazes or scratches which is capable of forming a film having a refractive index similar to those of glasses when applied onto colorless or pale transparent glass bottles and having an excellent graze concealing effect and wash-resistance.

A composition for concealing graze marks on colorless or pale transparent glass bottles of the present invention comprises an emulsion composition comprising:

(A) 100 parts by weight of polydiorganosiloxane having a viscosity of 10 to 100,000 cSt at 25° C. in which 15 to 60 mole percent of an organic group bonded to a silicon atom is an organic group selected from the group consisting of a phenyl group, an aralkyl group and an alkyl group having carbon atoms of 6 or more, (B) 1 to 100 parts by weight of film-forming polyorganosiloxane comprising;

(1) two or more straight-chain diorganosiloxane portions constituted by 10 or more diorganosiloxane units, and (2) one or two or more cross-linking portions formed by a reaction of an amino group bonded to a silicon atom through at least one carbon atom and zero or at least one nitrogen atom bonded indirectly to a silicon atom, with an epoxy group bonded to another silicon atom through at least one carbon atom and zero or at least one oxygen atom bonded indirectly to a silicon atom, wherein the proportional ratio of Part (2) in Component (B) is 0.1 to 30% by weight, (C) 1 to 30% by weight of a cationic surfactant or a surfactant mixture in which a part of the cationic surfactant is replaced with a nonionic surfactant based on the total amount of Components (A) and (B), (D) 60–1,000% by weight of water based on the total amount of Components (A) and (B), whereby forming a film having refractive index of 1.42 to 1.55 on the surface of glass bottles.

DESCRIPTION OF THE PREFERRED EMBODIMENTS

The polydiorganosiloxane of Component (A) employed in the present invention conceals grazes and scratches on glass bottles and provides transparency and smoothness thereon, having a viscosity of 10 to 100,000 cSt, preferably 300 to 10,000 cSt at 25° C. If the viscosity is less than 10 cSt, required smoothness could not be obtained and the polydiorganosiloxane would have a volatility and furthermore, would have tendancies to bleed out after being coated on a bottle surface to cause slip on the bottle surface and to form oil film on water when the coated bottle is dipped into water. As the viscosity increases, emulsification becomes more difficult, and if the viscosity exceeds 100,000 cSt emulsification is very difficult. The siloxane chain is substantially straight, but may be a branched or cyclic structure.

The organic groups bonded to silicon atoms may be exemplified by an alkyl group such as a methyl group, an ethyl group, a propyl group, a butyl group, a hexyl group, an octyl group, a decyl group, a dodecyl group, a tetradecyl group, a hexadecyl group and an octadecyl group; an aralkyl group such as a benzyl group, a $\beta$-phenylethyl group and a $\beta$-phenylpropyl group; an alkenyl group such as a vinyl group and an allyl group; an aryl group such as a phenyl group; and a chloromethyl group, a chlorophenyl group, a 3,3,3-trifluoropropyl group, a 3-cyanopropyl group, etc. The most important characteristic feature of present invention resides in that 15–60 mole percent of the above organic groups consist of a phenyl group, an aralkyl group or an alkyl group having carbon atoms of 6 or more. The organic group may be used solely or as mixtures of two or more. By using such a constitution, the refractive index of Component (A) contained in a film formed on the surface of a glass bottle is increased so that the refractive index of the film could be controlled within the desired range. If the amount of these organic groups is less than 15 mole %, the effect of increasing the refractive index is insufficient, and if it exceeds 60 mole %, it becomes difficult to synthesize homogeneously with good control. If the number of carbon atoms in the alkyl group is less than 6, the effect of increasing the refractive index is small and it is required to use a gaseous olefin for the synthesis, thus there is a disadvantage in the preparation thereof. The organic group other than the above may preferably be a methyl group because of stability, small change in viscosity depending upon temperature, keeping appropriate flowability in the wide range of temperature, showing lower viscosity depending upon a polymerization degree and ease of synthesis. The above mentioned organic group which characterises the present invention may be bonded to optional silicon atoms in the molecule. A terminal of the molecule may be a silicon functional group such as a silanol group, a methoxy group, an ethoxy group and a propoxy group, but from a view of stability, it is preferably terminated by a triorganosilyl group such as a trimethylsilyl group, a dimethylphenylsilyl group, a dimethyl($\beta$-ethylphenyl)silyl group. Such polydiorganosiloxane may be exemplified by polymethylphenylsiloxane, polymethyl($\beta$-phenylethyl)siloxane, polymethyl($\beta$-phenylpropyl)siloxane, polymethylhexylsiloxane, polymethyldecylsiloxane, polymethyldodecylsiloxane, polymethyltetradecylsiloxane, polymethylhexyl($\beta$-phenylpropyl)siloxane, and the like.

The film-forming polyorganosiloxane of Component (B) used in the present invention comprises polyorganosiloxane Part (1) substantially comprising a straight chain, and cross-linking Part (2) which acts to combine these plural molecular-chains (1) to each other, and has molecular structure in which two or more of Parts (1) are combined or cross-linked with each other through one or two or more of Parts (2), and it forms a film on the glass surface while retaining Component (A), having adhesiveness and flexibility, and easily removable by alkaline washing.

Part (1) gives smoothness and flexibility to the film, and further gives an effect for retaining Component (A)

in the film by a molecular structure similarity with Component (A). The siloxane chain thereof is substantially a straight chain, but may exist as a branched chain or a cyclic structure. The number of diorganosiloxane units constituting each of Part (1) is more than 10, preferably within the range of 20–1,000. If the number of siloxane unit is less than 10, the film becomes brittle because of insufficient flexibility, and elimination thereof by an alkaline washing is not easy.

As the organic groups bonded to silicon atoms, there may be mentioned, for example, alkyl groups such as a methyl group, an ethyl group, a propyl group, a butyl group, a hexyl group, an octyl group, a decyl group, a dodecyl group, a tetradecyl group, a hexadecyl group, an octadecyl group, etc.; aralkyl groups such as benzyl group, a β-phenylethyl group, a β-phenylpropyl group, etc.; alkenyl groups such as a vinyl group, an alkenyl group, etc.; aryl groups such as a phenyl group, etc.; and a chloromethyl group, chlorophenyl groups, a 3,3,3-trifluoropropyl group, a 3-cyanopropyl group, etc. The above organic groups may be the same or different, but for affinity with Component (A), 15–60 mole % of groups in all the organic groups may preferably be a phenyl group, an aralkyl group or alkyl group having carbon atoms of 6 or more, and the above organic groups may preferably be the same as the organic groups of the above Component (A) other than the methyl group. As the organic groups other than the above, it is preferred to employ a methyl group because of stability, easiness of synthesis and handling of the siloxane which is a starting material for synthesis to form Part (1).

At the ends of Part (1) which are not bonded to Part (2), there exists a silicon functional group such as a silanol group, a methoxy group and an ethoxy group. However, a part of the terminals of these molecules may be terminated by triorganosilyl groups such as a trimethylsilyl group, a dimethylphenylsilyl group, a dimethyl(β-phenylethyl)silyl group, etc.

Part (2) gives a film on surfaces of the glass bottles from Component (B) under mild conditions by bonding and cross-linking molecular chain of Part (1) to each other as well as giving adhesiveness to the glass surfaces and appropriate mechanical strength to the film, and forming cross-linked chains by the reaction of the following amino group and epoxy group.

The amino group is a group which bonds to a silicon atom through at least one carbon atom and zero or at least one nitrogen atom bonded indirectly to a silicon atom. As an organic group containing the amino group and being bonded to a silicon atom, there may generally be mentioned one represented by the formula:

$Q^1NHR^1—$ (wherein $Q^1$ represents a hydrogen atom, a methyl group, an ethyl group, a phenyl group, a β-aminoethyl group, or an N-(β-aminoethyl)-β-aminoethyl group; and $R^1$ represents a trimethylene group or a tetramethylene group each of which is bonded to a silicon atom), and may be exemplified by a γ-aminopropyl group, an N-methyl-γ-aminopropyl group and an N-(β-aminoethyl)-γ-aminopropyl group.

The epoxy group is a group which bonds to a silicon atom other than the above mentioned silicon atoms through at least one carbon atom and zero or at least one oxygen atom bonded indirectly to a silicon atom. As the organic group containing such the epoxy group and bonding to a silicon atom, there may generally be mentioned one represented by the formula:

$Q^2R^2—$ (wherein $Q^2$ represents a glycidoxy group or an epoxycyclohexyl group; and $R^2$ represents an ethylene group, a trimethylene group or a tetramethylene group each of which is bonded to a silicon atom), and may be exemplified by a γ-glycidoxypropyl group, a β-(3,4-epoxycyclohexyl) group, etc.

If the nitrogen atoms or oxygen atoms in the amino group, epoxy group or organic group bond directly to the silicon atoms, bonds with the silicon atoms will be cleaved by water, therefore it can not be used for the purpose of the present invention.

The silicon atom bonded to the above mentioned amino group-containing organic group or epoxy group-containing organic group, bonds a terminal of the polydiorganosiloxane chain of Part (1). In this case, the silicon atom preferably bonds to molecular chains of Part (1) by using 2–3 silicon functional-groups, such as methoxy groups or ethoxy groups per silicon atom in order to increase a cross-link density whereby to give a film-forming ability, particularly preferably bonds to the three molecular chains of Part (1).

A proportional ratio of Part (2) of Component (B) is 0.1–30% by weight, preferably 1–10% by weight, and Part (1) as a remainder. If Part (2) is less than 0.1% by weight, formation of a film having adhesiveness is difficult, and if it exceeds 30% by weight, elimination of the film becomes difficult by an alkaline washing.

Component (B) can be synthesized, for example, by the following method. That is to say, first by mixing 1 mole of an amino group-containing silane represented by the formula:

$Q^1NHR^1SiR_a^3(OR^4)_{3-a}$ (wherein $Q^1$ and $R^1$ are the same as the above; $R^3$ and $R^4$ each represent an alkyl group having 1–4 carbon atoms; a is an integer of 0 or 1), and 0.5–3.0 mole, preferably 0.75–1.5 mole of an epoxy group-containing silane represented by the formula:

$Q^4R^2SiR_b^5(OR^6)_{3-b}$ (wherein $Q^2$ and $R^2$ are the same as the above; $R^5$ and $R^6$ each represent an alkyl group having 1–4 carbon atoms; b is an integer of 0 or 1), and then stirring the mixture at 20°–120° C. under the anhydrous condition to be allowed to react them. The reaction products form Part (2) in Component (B). Then, the reaction products were added to a polydiorganosiloxane terminated by a silanol group at the both ends thereof and having a viscosity at 25° C. of 10–10,000 cSt, preferably 20–1,000 cSt, and the reaction was carried out at 40°–80° C. for several hours under a nitrogen gas stream. In this case, as a part of the polydiorganosiloxane, those which one end is terminated by a silanol group and the other is terminated by a triorganosilyl group may be used therewith.

The modified polyorganosiloxane thus obtained may be used as Component (B) itself, but in order to increase smoothness and flexibility of the film formed on the surface of the glass bottle by further extending a siloxane chain of Part (1) of Component (B), they can be obtained in an emulsion containing Component (B) by adding thereto a cationic surfactant, water, a cyclic diorganosiloxane and an alkali metal hydroxide having catalytic activity to obtain a homogeneous emulsion by using emulsifier, then stirred carrying out an emulsion polymerization heating to 60°–90° C. while stirring, followed by neutralizing the resultant products with hydrochloric acid, etc.

As the cyclic polydiorganosiloxane, there may be mentioned, for example, hexamethylcyclotrisiloxane, octamethylcyclotetrasiloxane, decamethylcyclopentasiloxane, dodecamethylcyclohexasiloxane, phenylheptamethylcyclotetrasiloxane, 1,1-diphenylhexamethylcyclotetrasiloxane, 1,1,3,3-tetraphenyltetramethylcyclotetrasiloxane, 1,3,5,7-tetraphenyltetramethylcyclotetrasiloxane, 1,3,5,7-tetra($\beta$-phenylethyl)tetramethylcyclotetrasiloxane, 1,3,5,7-tetra($\beta$-phenylpropyl)tetramethylcyclotetrasiloxane, 1,3,5,7-tetradecyltetramethylcyclotetrasiloxane, 1,3,5-tris(3,3,3-trifluoropropyl)trimethylcyclotrisiloxane, etc. They may be used alone or as mixtures thereof. As the cationic surfactant, there may be mentioned, for example, a quaternary ammonium salt. There may be used a nonionic surfactant in combination therewith at the emulsification or after emulsion polymerization.

The alkali metal hydroxide may be exemplified by sodium hydroxide, potassium hydroxide, rubidium hydroxide and cesium hydroxide.

An amount of Component (B) to be formulated is within the range of 1–100 parts by weight based on 100 parts by weight of Component (A), preferably 5–50 parts by weight. If Component (B) is less than 1 part by weight, there could not be formed an adhesive film on the surface of the glass bottle. On the other hand, if Component (B) exceeds 100 parts by weight, the film formed could not be removed perfectly in a bottle washing process.

Component (C) to be used in the present invention is used in a part thereof to the emulsion polymerization for synthesizing Component (B), or used as a stabilizer for a system after the emulsion polymerization if desired, or is used for emulsifying Component (B) when Component (B) was not synthesized via an emulsion polymerization process, and the remainder is used for emulsifying Component (A) and becomes a constituent component of a graze concealing agent of the present invention.

As the cationic surfactant used for Component (C), there may be exemplified by alkyltrimethylammonium salts such as hexadecyltrimethylammonium chloride and octadecyltrimethylammonium chloride; dialkyldimethylammonium salts such as didodecyldimethylammonium chloride, dihexadecyldimethylammonium chloride and dioctadecyldimethylammonium chloride; benzalconium salts such as hexadecyldimethylbenzylammonium chloride and octadecyldimethylbenzylammonium chloride. They may be employed alone or in combination of two or more.

As a part of Component (C), a nonionic surfactant may be employed in combination therewith. The nonionic surfactant may be exemplified by glycerol fatty acid ester, sorbitan fatty acid ester, polyoxyethylene glycerol fatty acid ester, polyoxyethylene sorbitan fatty acid ester, polyoxyethylene fatty acid ester, polyoxyethylene aliphatic alcohol ether, polyoxyethylene alkylphenol ether, tetraorganoammonium salt, and the like. They may be employed alone or in combination with two or more.

An amount of Component (C) to be formulated is 1–30% by weight based on the total amounts of Components (A) and (B), preferably 5–15% by weight. If the amount of Component (C) is less than 1% by weight or in excess of 30% by weight, good emulsifying conditions at the emulsion polymerization for synthesizing Component (B) could not be obtained, and no stable emulsion as a graze concealing agent could be obtained.

An amount of water of Component (D) is within the range of 60–1,000% by weight based on the total amounts of Components (A) and (B), preferably 100–400% by weight. If the amount of Component (D) is less than 60% by weight or in excess of 1,000% by weight, the storage stability of the emulsion becomes poor.

A graze concealing agent of the present invention can be prepared by each of the following methods, but the method (a) is the most excellent therein for preparing a composition which has excellent storage stability as a concealing emulsion, and a film having properties of appropriate flexibility and smoothness on a surface of a glass bottle, excellent concealing effects for grazes, and easily removable in an alkaline washing process.

(a) synthesizing Component (B) in an emulsion state by emulsion polymerization using a part of Components (C) and (D), while preparing an emulsion of Component (A) by using remaining Components (C) and (D), individually, and then mixing both of emulsions homogeneously.

(b) To each of Component (B) synthesized by other than the emulsion polymerization and Component (A) of the same is added Components (C) and (D) to prepare emulsions and mixing both of them homogeneously.

(c) mixing Component (B) and Component (A) each synthesized by other than the emulsion polymerization, and emulsifying them by using of Components (C) and (D).

The emulsification in each case can be carried out by using a pressure type or high speed rotary type emulsifier.

By coating the thus obtained emulsion composition of the present invention directly or by diluting within 30-fold, preferably 3 to 5-fold, on a grazed or scratched surface of a glass bottle and evaporating the contained water, a silicone film can be formed on the glass surface. With respect to the method for applying the coating, brush-coating, spraying, puff-coating, dip-coating and the like may be used. The thickness of the film may be within the range of 0.5–10 $\mu$m, preferably 1–3 $\mu$m, to obtain a film having a graze-concealing effect, a proper degree of strength, and easy washability in the bottle washing process. If necessary it is sufficient to form a film of the concealing agent of the present invention to the above-mentioned thickness, at least on the grazed portion, and, in this case, the method for forming the film is not limited, but normally brushing or spraying is convenient.

The film formed on the surface of a glass bottle by a graze-concealing agent of the present invention shows a refractive index of 1.42–1.55, preferably 1.47–1.54. If the refractive index is less than 1.42, concealing ability for grazes or scratches of colorless or pale transparent glass bottle is insufficient, and if it exceeds 1.55, synthesis of Components (A) and (B) with good controllability is difficult.

EXAMPLE

The present invention will be explained by referring to Examples in the following. In these Examples, all parts are given as parts by weight. Viscosity is shown at 25° C., and refractive index shows a value of D-line at 25° C.

REFERENCE EXAMPLE 1

An amino group-containing silane and an epoxy group-containing silane shown in Table 1 were mixed, and stirred under heating at 85° C. for 3 hours to synthesize reaction products named S-1 to S-4, stoichiometrically. These reaction products were colorless transparent liquids, respectively.

TABLE 1

| Experimental No. | 1 | 2 | 3 | 4 |
|---|---|---|---|---|
| Amino group-containing silane (parts) | | | | |
| γ-aminopropyltriethoxysilane | 22.1 | | | |
| N—(β-aminoethyl)-γ-aminopropyltrimethoxysilane | | 22.2 | 22.2 | 11.1 |
| N—(β-aminoethyl)-γ-aminopropylmethyldimethoxysilane | | | | 10.3 |
| Epoxy group-containing silane (parts) | | | | |
| γ-glycidoxypropyltrimethoxysilane | 23.6 | | 11.8 | |
| γ-glycidoxypropylmethyldimethoxysilane | | | 11.0 | |
| β-(3,4-epoxycyclohexyl)ethyltrimethoxysilane | | 24.1 | | 24.1 |
| Reaction Product | S-1 | S-2 | S-3 | S-4 |

REFERENCE EXAMPLE 2

To 85 parts of α,ω-dihydroxypolymethylsiloxane having a viscosity of 200 cSt at 25° C. was added 15 parts of the reaction product S-1 synthesized in Referential Example 1. Then, the mixture was stirred under heating at 80° C. for 3 hours to obtain a colorless transparent oily product. Ten parts of this oily product were mixed with 25 parts of the cyclic polydimethylsiloxane mixture comprising 8% by weight of hexamethylcyclotrisiloxane, 79% by weight of octamethylcyclotetrasiloxane and 13% by weight of decamethylcyclopentasiloxane, 3 parts of dihexadecyldimethylammonium chloride and 61.5 parts of water, and 0.5 parts of potassium hydroxide was added thereto, and the mixture was stirred to obtain a roughly emulsified mixture. The mixture was then passed through a colloid mill of which the mill gap had been adjusted to 10 mil to emulsify, and after the obtained emulsion was stirred under heating at 75° C. for 3 hours, cooled to 40° C., and neutralized by adding an aqueous solution of acetic acid, thus producing an emulsion L-1 of film-forming polyorganosiloxane.

EXAMPLE 1

Base fluids F-1 to F-6 illustrated in Table 2 and surfactants were combined in a proportional ratio illustrated in Table 3, and mixed at 50° C. for 1 hour by using the homomixer (Produced by Tokushu Kiko K.K.), then treated by a colloid mill with a mill gap of 10 mil and cooled to room temperature to prepare emulsions named E-1 to E-6. These emulsions and emulsion L-1 obtained in Reference example 2 were mixed in a proportional ratio illustrated in Table 3, and the mixture was stirred to obtain graze-proof agents named M-11 to M-16.

TABLE 2

| Base fluid | Organic group | | | | Polymerization degree | | Viscosity (25° C.) cSt |
|---|---|---|---|---|---|---|---|
| | $R^A$ | $R^B$ | $R^C$ | $R^D$ | n | m | |
| F-1 | methyl | methyl | phenyl | phenyl | 10 | 5 | 500 |
| F-2 | methyl | methyl | phenyl | phenyl | 2.5 | 2.5 | 50 |
| F-3 (comparative example) | methyl | methyl | phenyl | phenyl | 50 | 2.5 | 150 |
| F-4 | methyl | hexyl | methyl | β-phenyl propyl | 35 | 35 | 3,000 |
| F-5 | methyl | methyl | methyl | decyl | 7 | 70 | 1,000 |
| F-6 (comparative example) | methyl | methyl | — | — | 230 | — | 1,000 |

Note:
Organic groups $R^A$–$R^D$ and degree of polymerization n and m of the above Table correspond to the following formula.

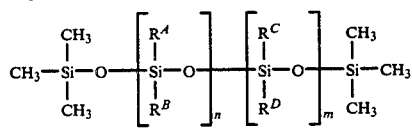

TABLE 3

| Experiment No. | 11 | 12 | 13 (comparative example) | 14 | 15 | 16 (comparative example) |
|---|---|---|---|---|---|---|
| Base fluid | F-1 | F-2 | F-3 | F-4 | F-5 | F-6 |
| Composition of emulsion (parts) | | | | | | |
| Base fluid | 35 | 35 | 35 | 35 | 35 | 35 |
| Sorbitan monostearate | 1 | 1 | | | | 2 |
| Polyoxyethylene(20)-sorbitan monostearate | 4 | 4 | | | | 3 |
| Polyoxyethylene(5)-nonylphenylether | | | 1.5 | 2 | 2 | |
| Polyoxyethylene(30)-nonylphenylether | | | 3.5 | 3 | 3 | |
| Water | 60 | 60 | 60 | 60 | 60 | 60 |
| Emulsion | E-1 | E-2 | E-3 | E-4 | E-5 | E-6 |

TABLE 3-continued

| Experiment No. | 11 | 12 | 13 (comparative example) | 14 | 15 | 16 (comparative example) |
|---|---|---|---|---|---|---|
| E-1 to E-6/L-1 ratio | | | | 90/10 | | |
| Graze concealing agent | M-11 | M-12 | M-13 (comparative example) | M-14 | M-15 | M-16 (comparative example) |

Note:
The number within parentheses in the chemical name of the surfactants is the added molar number of polyoxyethylene.

Base fluids F-3 and F-6 are comparative samples comprising polymethylphenylsiloxane containing less amount of phenyl group or polydimethylsiloxane, and thus, graze concealing agents M-13 and M-16 are also comparative samples.

The graze concealing agents thus obtained were each placed in a laboratory dish and heated at 105° C. for 5 hours to evaporate water. The resultant gel-like products were measured for their refractive index. The results were shown in Table 4.

These graze concealing agents were each diluted with water 3-fold to prepare a treating agent. Colorless transparent bottles whose surfaces have been grazed were settled in a vessel. The treating agent was filled into the vessel outside of the bottles up to over 20 mm of shoulders of the bottles to dip the bottle surfaces. The bottles were picked up after 3 minutes and dried 12 hours at room temperature to form a silicone film on the outside surfaces of the bottles. With respect to the thus obtained films, tests for the concealing property for grazes, smell, unusual lubricity, oil film formed water and appearance change when dipped in water, and the ability to be removed by a 2% aqueous sodium hydroxide solution were made, respectively. The results were shown in Table 4.

TABLE 4

| Graze concealing agent | M-11 | M-12 | M-13 (comparative example) | M-14 | M-15 | M-16 (comparative example) |
|---|---|---|---|---|---|---|
| Refractive index | 1.506 | 1.476 | 1.423 | 1.492 | 1.450 | 1.406 |
| Coating test for glass bottle | | | | | | |
| Concealing property for graves | | | Δ | | | X |
| Absence of smell | | | | | | |
| No unusual lubricity | | | Δ | | | X |
| When dipped in water no oil film formed on water | | | | | | |
| When dipped in water no appearance change | | | | | | |
| Removable by aqueous alkaline solution | | | | | | |

Note
◯: Excellent
◎: Good
Δ: Fair
X: Poor

EXAMPLE 2

The reaction was carried out in the same manner as described in Reference example 2 to obtain emulsions named L-2 to L-4 of film-forming polyorganosiloxanes, except that $\alpha,\omega$-dihydroxypolydimethylsiloxane having a viscosity of 500 cSt at 25° C., the reaction products S-2 to S-4 synthesized in Reference example 1, octamethylcyclotetrasiloxane as a cyclic diorganosiloxane, surfactants, catalysts and water were used respectively in amounts illustrated in Table 5. Fifteen parts of these emulsions were mixed homogeneously with 85 parts of emulsion E-4 prepared in Example 1 to obtain graze concealing agents named M-21 to M-23, respectively.

These agents were tested as in Example 1, the results are shown in Table 6.

TABLE 5

| Experimental Number | 21 | 22 | 23 |
|---|---|---|---|
| Reaction product | S-2 | S-3 | S-4 |
| Formulated amount (parts) | | | |
| Reaction product | 1 | 1.8 | 1.8 |
| $\alpha,\omega$-dihydroxypolydimethylsiloxane (700 cSt) | 13 | 12.2 | 12.2 |
| Octamethylcyclotetrasiloxane | 21 | 21 | 21 |
| Dihexadecyldimethylammonium chloride | 2 | 2 | 2 |
| Trihexadecylmethylammonium chloride | 1.5 | 1.5 | 1.5 |
| Potassium hydroxide | 0.5 | 0.5 | 0.5 |
| Water | 61 | 61 | 61 |
| Emulsion | L-2 | L-3 | L-4 |
| Graze concealing agent | M-21 | M-22 | M-23 |

TABLE 6

| Graze concealing agent | M-21 | M-22 | M-23 |
|---|---|---|---|
| Refractive index | 1.491 | 1.490 | 1.490 |
| Coating test for glass bottle | | | |
| Concealing property for grazes | | | |
| Absence of smell | | | |
| No unusual lubricity | | | |
| When dipped in water no oil film formed on water | | | |
| When dipped in water no appearance change | | | |
| Removable by alkaline water | | | |

Note:
Symbols in the above table are the same as in Table 4.

EXAMPLE 3

Emulsions named E-7 to E-9 were prepared in the same manner as in the preparation of F-4 in Example 1, except that base fluids F-7 to F-9 illustrated in Table 7 were used. 88 parts of each emulsion and 12 parts of emulsion L-1 of film-forming polyorganosiloxane prepared in Reference example 2 were mixed homogeneously to prepare graze concealing agents M-31 to M-33. These agents were tested in the same manner as described in Example 1, and the results were obtained as shown in Table 8.

TABLE 7

| Experi-mental No. | Base fluid | Organic group | | | | Polymerization degree | | Viscosity (25° C.) cSt | Emulsion formed | Graze concealing agent |
|---|---|---|---|---|---|---|---|---|---|---|
| | | $R^A$ | $R^B$ | $R^C$ | $R^D$ | n | m | | | |
| 31 | F-7 | methyl | methyl | phenyl | phenyl | 72 | 28 | 2,800 | E-7 | M-31 |
| 32 | F-8 | methyl | hexyl | — | — | 60 | — | 350 | E-8 | M-32 |
| 33 | F-9 | methyl | methyl | methyl | β-phenyl propyl | 10 | 50 | 3,200 | E-9 | M-33 |

Note:
$R^A$–$R^D$, n and m are the same as in Table 2.

TABLE 8

| Graze concealing agent | M-31 | M-32 | M-33 |
|---|---|---|---|
| Refractive index | 1.501 | 1.440 | 1.518 |
| Coating test for glass bottle | | | |
| concealing property for grazes | | | |
| Absence of smell | | | |
| No unusual lubricity | | | |
| When dipped in water no oil film formed on water | | | |
| When dipped in water no appearance change | | | |
| Removable by alkaline water | | | |

Note:
Symbols in the above table are the same as in Table 4.

EXAMPLE 4

Emulsion named L-5 and L-6 of film-forming polyorganosiloxane were obtained in the same manner as described in Reference example 2, except that reaction product S-1 synthesized in Referential example 1 and polydiorganosiloxane as illustrated in Table 9 were used as a starting material for forming straight chain portion of the film-forming polyorganosiloxane. The above emulsions and the emulsions E-7 and E-8 prepared in Example 3 were homogeneously mixed in a proportional ratio illustrated in Table 9 to obtain graze concealing agent named M-41 and M-42, respectively. These agents were tested in the same manner as described in Example 1, and the results were obtained as shown in Table 10.

TABLE 9

| Experimental No. | 41 | 42 |
|---|---|---|
| Proportional ratio (parts) | | |
| S-1 | 3 | 3 |
| α,ω-dihydroxypolydiorganosiloxane [dimethylsiloxy unit: 75 mole % / diphenylsiloxy unit: 25 mole % / viscosity (25° C.): 1500 cSt] | 50 | — |
| α,ω-dihydroxypolydiorganosiloxane [methylhexylsiloxy unit: 100 mole % / viscosity (25° C.): 800 cSt] | — | 40 |
| 1,1-diphenyl-3,3,5,5,7,7-hexamethyl-cyclotetrasiloxane | 47 | — |
| 1,3,5,7-tetramethyl-1,3,5,7-tetra-hexylcyclotetrasiloxane | — | 57 |
| Emulsion | L-5 | L-6 |
| Emulsion mixing ratio | | |
| E-7/L-5 | 90/10 | — |
| E-8/L-6 | — | 90/10 |
| Graze concealing agent | M-41 | M-42 |

TABLE 10

| Graze concealing agent | M-41 | M-42 |
|---|---|---|
| Refractive index | 1.505 | 1.443 |
| Coating test for glass bottle | | |
| Concealing property for grazes | | |
| Absence of smell | | |
| No unusual lubricity | | |
| When dipped in water no oil film formed on water | | |
| When dipped in water no appearance change | | |
| Removable by alkaline water | | |

Note:
Symbols in the above table are the same as in Table 4.

As described above, the graze concealing agent of the present invention can completely conceal grazes or scratches of the glass bottle when it has been applied as a film onto the colorless or pale transparent glass bottle.

Further, an advantage of the graze concealing agent of the present invention is that no organic solvent is used and thus there are no considerations respecting flammability in the coating process or sanitary problems due to residual solvent. Furthermore, an additional advantage of this invention is that higher film-forming ability and improved adhesiveness are obtained while employing a smaller amount of an amino group and most or all of the amino groups are reacted with epoxy groups so that no yellowing or change of properties occurs upon standing as a result of unreacted amino groups. Another advantage of the present invention is that by using film-forming polyorganosiloxane, the resulting film does not fall off under the usual conditions of bottling or use, an oily film does not form on the surface of water when the coated bottle is dipped therein, and also by including the polydiorganosiloxane fluid, the film has an improved ability to conceal grazes or scratches, yet it is still easily removable during the bottle washing process.

The present invention thus offers a concealing agent that contains no organic solvents nor organo-tin compounds and which forms a concealing film for grazes safely and easily on the surface of a glass bottle. The film obtained by the present invention has excellent graze concealing ability, is water resistant, adheres to glass bottles, and is tough under the usual conditions of bottling, transporting and storing. Its surface has no stickiness or unusual lubricity. It is colorless and does not change color upon extended storage. Moreover, it is easily removable in a bottle washing process with an aqueous alkaline solution so that its appearance is not harmed by a partial removal of the coating.

We claim:
1. An emulsion composition for concealing graze marks on transparent glass bottles comprising;
(A) 100 parts by weight of polydiorganosiloxane having a viscosity of 10 to 100,000 cSt at 25° C. in which 15 to 60 mole percent of the organo groups bonded to silicon atoms are organo groups selected from the group consisting of phenyl and aralkyl,
(B) 1 to 100 parts by weight of film-forming polyorganosiloxane comprising;
  (1) two or more straight-chain diorganosiloxane portions comprising at least 10 diorganosiloxane units, and
  (2) one or more cross-linking portions formed by the reaction of an amino group bonded to a silicon atom through at least one carbon atom and zero or at least one nitrogen atom bonded indirectly to the silicon atom, with an epoxy group bonded to another silicon atom through at least one carbon atom and zero or at least one oxygen atom bonded indirectly to said another silicon atom, wherein the amount of Part (2) in Component (B) is 0.1 to 30% by weight,
(C) 1 to 30% by weight of a cationic surfactant or a surfactant mixture of the cationic surfactant and a nonionic surfactant based on the total amount of Components (A) and (B),
(D) 60–1,000% by weight of water based on the total amount of Components (A) and (B),
said composition being effective to form a film having refractive index of 1.47 to 1.54 on the surfaces of glass bottles.

2. An emulsion composition for concealing graze marks on transparent glass bottles of claim 1, wherein Component (A) is a polymethylphenylsiloxane.

3. An emulsion composition for concealing graze marks on transparent glass bottles of claim 1, wherein Component (A) is a polydiorganosiloxane in which the organo groups are methyl and aralkyl.

4. An emulsion composition for concealing graze marks on transparent glass bottles of claim 1, wherein the viscosity of Component (A) is 300–10,000 cSt at 25° C.

5. An emulsion composition for concealing graze marks on transparent glass bottles of claim 1, wherein 15–60 mole percent of the organo groups bonded to the silicon atoms of Component (B) are phenyl groups.

6. An emulsion composition for concealing graze marks on transparent glass bottles of claim 1, wherein 15–60 mole percent of the organo groups bonded to the silicon atoms of Component (B) are aralkyl or alkyl having 6 or more carbon atoms.

7. An emulsion composition for concealing graze marks on transparent glass bottles of claim 1, wherein the amount of the part (2) of Component (B) is 1–10% by weight.

8. An emulsion composition for concealing graze marks on transparent glass bottles of claim 1, wherein the amount of Component (B) is 5–50 parts by weight.

9. An emulsion composition for concealing graze marks on transparent glass bottles of claim 1, wherein the amount of Component (C) is 5–15% by weight based on the total amounts of Components (A) and (B).

10. An emulsion composition for concealing graze marks on transparent glass bottles of claim 1 wherein the amount of Component (D) is 100–400% by weight based on the total amounts of components (A) and (B).

11. An emulsion composition for concealing graze marks on glass, consisting essentially of:
(A) 100 parts by weight of a first polydiorganosiloxane which is liquid at room temperature and has a viscosity of from 10 to 100,000 cSt at 25° C., from 15 to 60 mole percent of the organo groups of said polydiorganosiloxane being selected from the group consisting of phenyl and aralkyl and the balance is methyl,
(B) from 1 to 100 parts by weight of a second polydiorganosiloxane which is capable of forming an adhesive film on glass at room temperature, said second polydiorganosiloxane consisting of (1) polydiorganosiloxane cross-linked with from 0.1 to 30 wt.% of (2) a cross-linking agent, said polydiorganosiloxane (1) containing more than 10 diorganosiloxane units in the molecule, said polydiorganosiloxane (1) containing from 15 to 60 mole percent of organo groups selected from the group consisting of phenyl and aralkyl and the balance is methyl, said cross-linking agent being the reaction product of the reaction between 1 mole of $$Q^1NHR^1SiR_a^3(OR^4)_{3-a}$$

wherein $Q^1$ is hydrogen, methyl, ethyl, phenyl, β-aminoethyl or N-(β-aminoethyl)-β-aminoethyl, $R^1$ is trimethylene or tetramethylene, $R^3$ and $R^4$ each is alkyl having 1 to 4 carbon atoms, and a is 0 or 1, with from 0.5 to 3.0 moles of $$Q^2R^2SiR_b^5(OR^6)_{3-b}$$

wherein $Q^2$ is glycidoxy or epoxycyclohexyl, $R^2$ is ethylene, trimethylene or tetramethylene, $R^5$ and $R^6$ each is alkyl having 1 to 4 carbon atoms, and b is 0 or 1,
(C) from 1 to 30 wt.%, based on the sum of weights of (A) and (B), of a quaternary ammonium cationic surfactant or a mixture of said quaternary ammonium cationic surfactant and a nonionic surfactant, and
(D) from 60 to 1,000 wt.%, based on the sum of the weights of (A) and (B), of water,
said emulsion composition forming a film having a refractive index of 1.47 to 1.54 on the surfaces of glass bottles.

* * * * *